Figure 5:
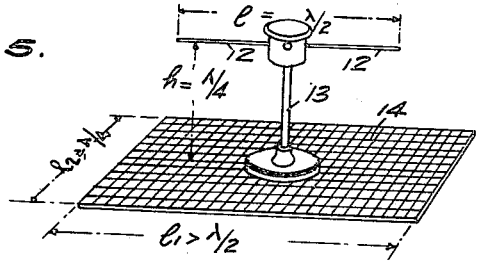

Oct. 3, 1939.   C. D. BARBULESCO   2,174,548
AIRCRAFT NAVIGATION AND LANDING SYSTEM
Filed Aug. 19, 1937   3 Sheets-Sheet 1
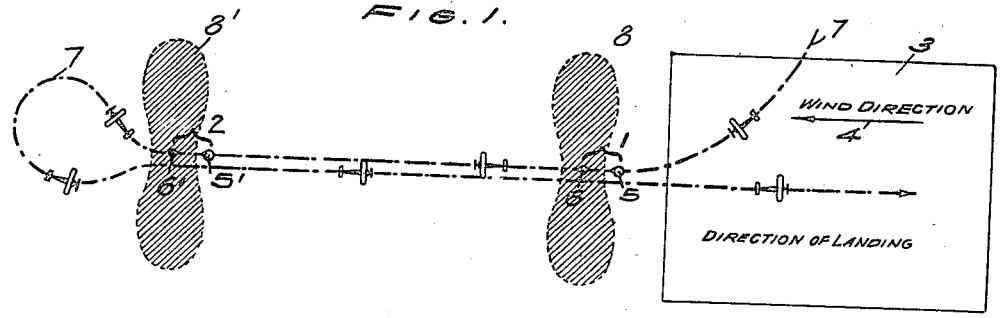
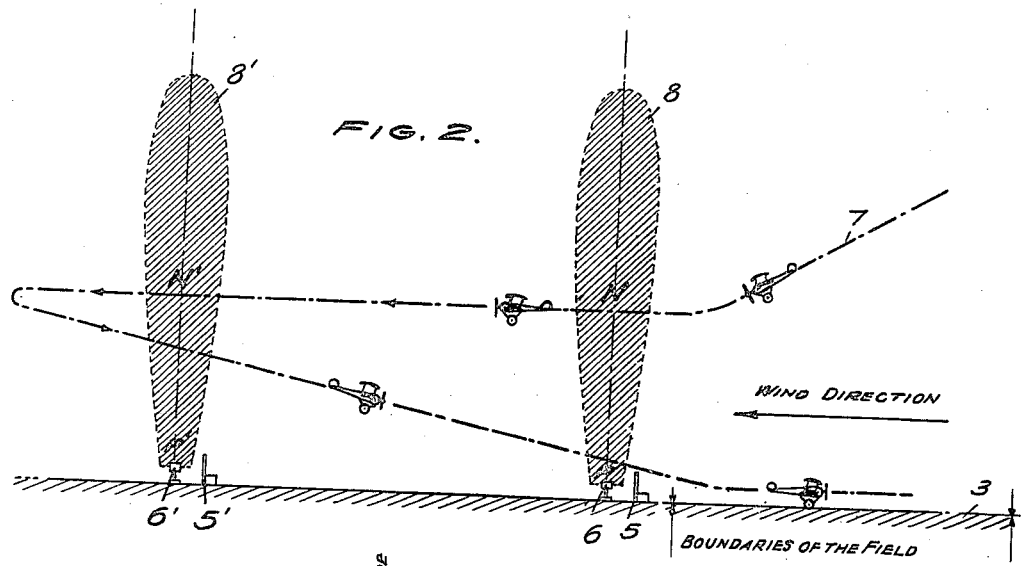
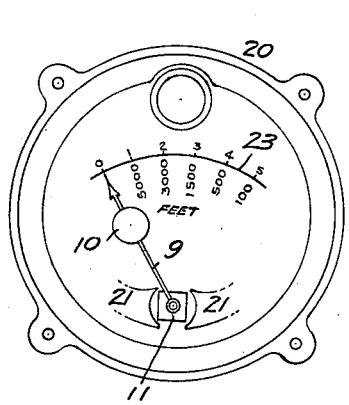
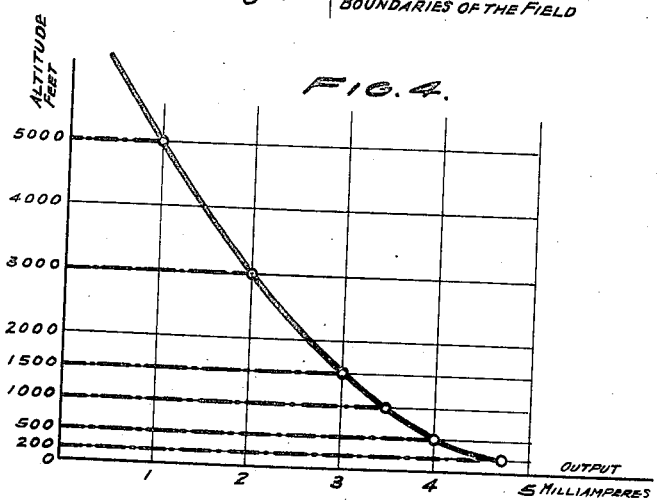
INVENTOR
CONSTANTIN D. BARBULESCO
ATTORNEYS Oct. 3, 1939. C. D. BARBULESCO 2,174,548
AIRCRAFT NAVIGATION AND LANDING SYSTEM
Filed Aug. 19, 1937 3 Sheets-Sheet 2

INVENTOR
CONSTANTIN D. BARBULESCO
By
ATTORNEYS

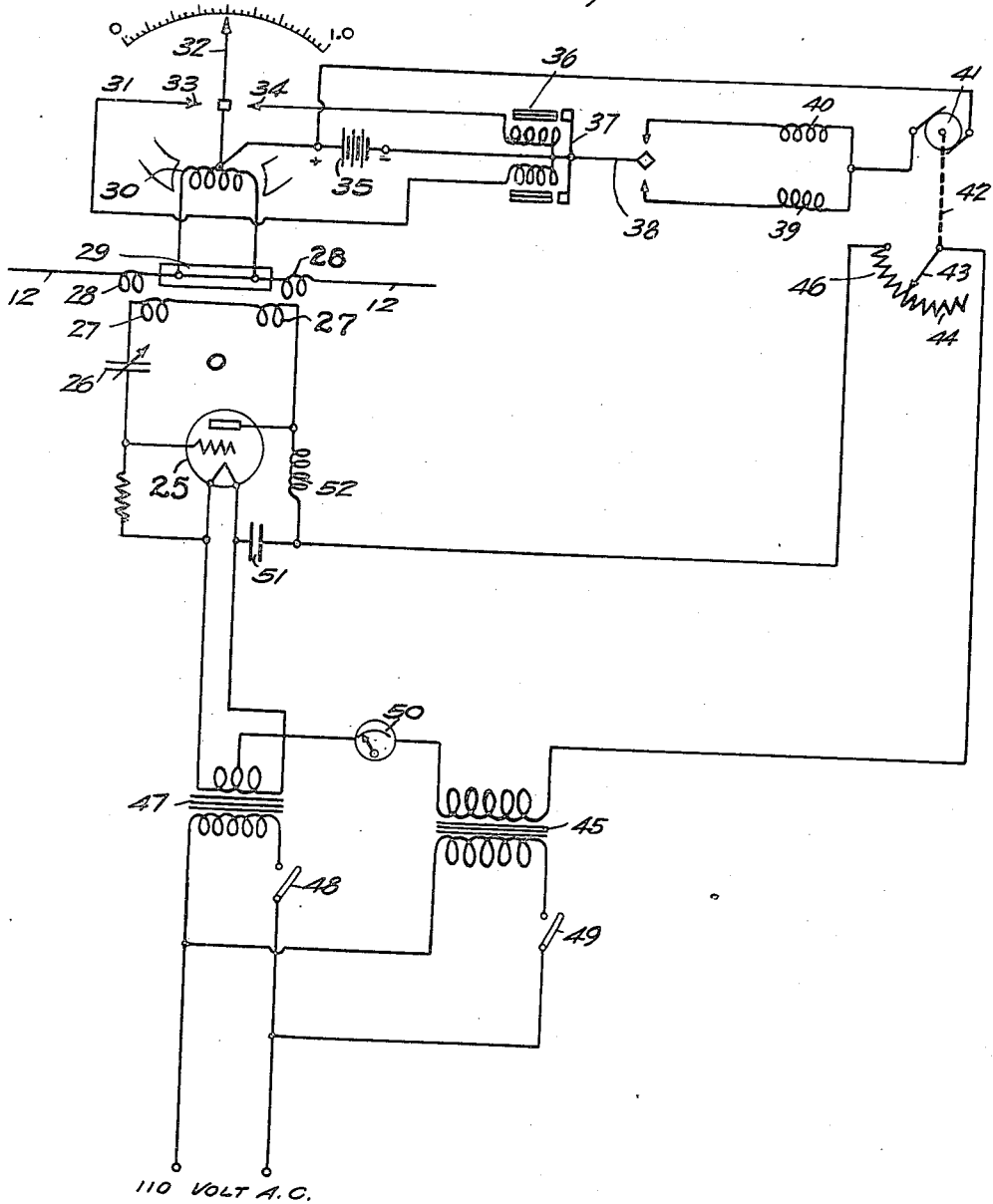

Patented Oct. 3, 1939

2,174,548

UNITED STATES PATENT OFFICE 2,174,548

AIRCRAFT NAVIGATION AND LANDING SYSTEM

Constantin D. Barbulesco, Dayton, Ohio

Application August 19, 1937, Serial No. 159,924

7 Claims. (Cl. 250—11)

(Granted under the act of March 3, 1883, as amended April 30, 1928; 370 O. G. 757)

The invention described herein may be manufactured and used by or for the Government for governmental purposes, without the payment to me of any royalty thereon.

My invention relates broadly to aircraft navigation systems and more particularly to a radio aid to air navigation for facilitating the navigation and landing of aircraft with a high degree of precision and safety.

My invention is directed to a system of navigating and landing aircraft under conditions of poor visibility in which the path of flight is determined by two or more radio guiding stations on the ground.

In the system of my invention the distance from the boundary of the field is determined with the aid of marker beacons of ultra-high frequency as described in my copending application Serial No. 4,921, filed February 4, 1935, Patent No. 2,124,533, dated July 26, 1938 by operation of indicating apparatus on the aircraft.

One of the objects of my invention is to provide an arrangement of indicating apparatus for aircraft operative for simultaneously advising the pilot of the passage of the aircraft over a radio guide station and also informing the pilot of the altitude of the aircraft at the time of such passage.

Another object of my invention is to provide an arrangement of marker beacons having means for maintaining constant emission of ultra-high frequency energy for operating a calibrated indicator carried by the aircraft and insuring accurate readings of altitude on the indicator.

Still another object of my invention is to provide an arrangement of indicating apparatus for installation on aircraft which visually shows both the distance of the aircraft from the landing field and the altitude of the aircraft above a marker beacon.

A further object of my invention is to provide means in a marker beacon transmitting station for propagating a substantially fan shaped beam of ultra-high frequency energy at a predetermined field strength inversely as the distance from the ground.

A still further object of my invention is to provide a construction of calibrated indicator adapted to indicate by a flash signal the time of passage of the aircraft over a marker beacon and to immediately thereafter indicate the altitude of the aircraft over the marker beacon according to the reading of the calibrated indicator.

Figure 6:
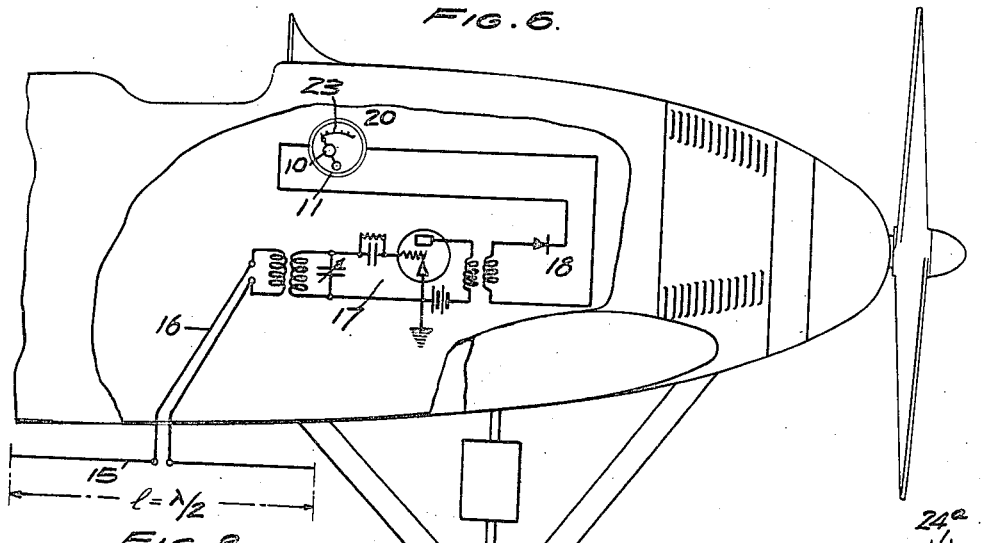
Figure 8:
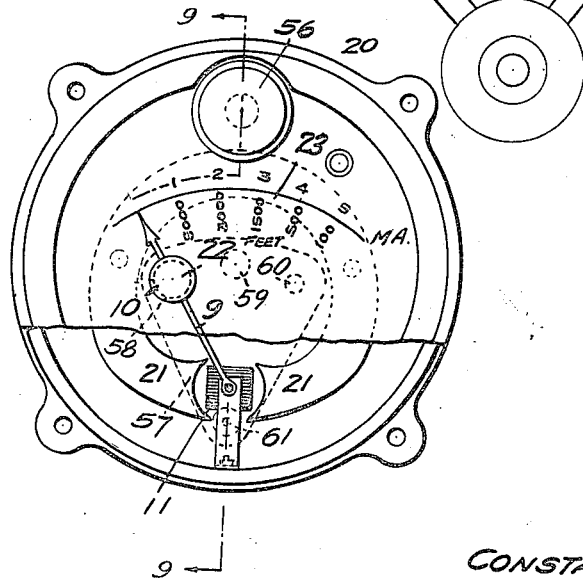
Figure 9:
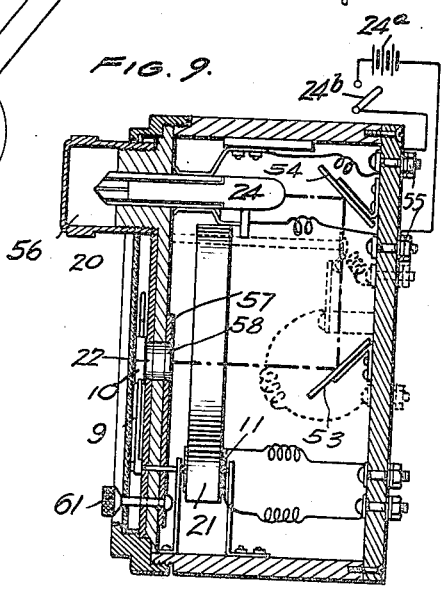

Other and further objects of my invention will be understood from the specification hereinafter following by reference to the accompanying drawings in which:

Figure 1 shows schematically the arrangement of guiding stations and marker beacon stations with respect to a landing field in the system in which my invention is utilized; Fig. 2 is a vertical sectional view along the path of landing in the system shown in Fig. 1; Fig. 3 is a front elevational view of the indicating instrument employed in the system of my invention; Fig. 4 is a calibration curve developed from actual flight data from which the scale of the indicating instrument shown in Fig. 3 is calibrated; Fig. 5 shows a schematic arrangement of the marker beacon transmitter employed in the system of my invention; Fig. 6 illustrates the manner of mounting the marker beacon receiving apparatus and indicating mechanism on an aircraft; Fig. 7 shows the circuit arrangement for controlling the field strength of the propagated electromagnetic beam; Fig. 8 is a front view partially broken away showing the manner in which the flash signal is made observable as the aircraft enters the propagated field of force and the manner in which the altitude of the aircraft above the landing field is rendered visible while the aircraft is passing through the beam; and Fig. 9 is a vertical sectional view through the indicating mechanism of my invention.

In the present status of the art, the altitude of the aircraft above the landing area is supplied to the pilot by radio communication from aircraft traffic control stations on the ground. The barometric altimeter is corrected to indicate zero when the aircraft leaves the field and the landing is negotiated with this corrected altimeter. Such a system is dependent upon the accuracy of the ground station operators and accordingly non-automatic and is expensive because it requires additional radio equipment and personnel to watch and direct the landing of incoming aircraft. Moreover, there are conditions under which an emergency landing may be necessary at an emergency landing field not provided with a radio operator or airway traffic control facilities.

The marker beam system described in my copending application No. 4,921 supra, may be used to automatically furnish altitude indication in addition to position indication. This is accomplished as set forth more fully in the specification hereinafter following.

Referring to the drawings in detail, Fig. 1 shows the location of the guiding stations 1 and 2 with respect to the boundary of the landing field 3 for a wind direction indicated by the arrow 4. Each guiding station has a non-directional radio transmitter 5, 5', and a directional marker beam projector 6, 6', generating a vertical fan shaped beam perpendicular to the path of flight. The path followed by the aircraft negotiating the landing is also shown by the dotted line 7. The shadowed surfaces 8, 8', represent horizontal sections through the fan shaped beams produced by the marker beam projectors.

In Fig. 2 a vertical section along the path of landing is shown. Along the axis P. N. of the beam the value of the electromagnetic field varies inversely with the distance from the ground and can be used for altitude determination by providing a pointer 9 and a calibrated scale 23 on the indicator 20 as shown in Fig. 3.

This indicator constitutes an output meter in the marker beacon receiver on the aircraft and can be calibrated directly in feet as shown in Fig. 3. This calibration originally is effected by comparison with a precision barometric altimeter flying through the beam at right angles directly over the projector and recording the maximum deflection of the output meter. A calibration curve is first drawn as shown in Fig. 4, and the meter is calibrated from this curve. The curve illustrated is the result of a series of flight tests carried on with the facilities of the Air Corps of the United States Army at Wright Field, Dayton, Ohio, in order to check the accuracy of the altitude indications for a constant radiation of the projector and a constant gain of the receiver in the aircraft.

The projector was operated at a frequency of 75 megacycles modulated at sixty cycles feeding approximately one ampere into a horizontal doublet, supported on pedestal 13 a quarter wave above a metallic screen 14 as shown in Fig. 5.

The receptor uses a horizontal doublet 15 installed under the fuselage of the aircraft parallel to the longitudinal axis thereof as shown in Fig. 6. The energy collected by the doublet 15 is transferred through a transmission line 16 to a tuned detector 17. After detection the modulation frequency is rectified by use of an oxide type rectifier 18 and the direct current obtained is used to actuate the moving coil 11 of the indicator 20 in permanent field 21 shown in Fig. 3. The moving coil 11 moves the needle 9 which carries the disc 10 uncovering aperture 22 in alignment with mirror 53 to which light is directed by mirror 54 from the light 24 mounted in the case of indicator 20 as shown in Figs. 8 and 9. Light 24 is continuously illuminated from a suitable source such as battery 24a through switch 24b, connected through terminals 55 as shown. Removable cover 56 is provided for the replacement of lamp 24 as may be required. The effective size of the sight aperture 22 is controlled by movement of the plate member 57 which carries apertures 58, 59 and 60, of different sizes and which may be moved into alignment with the path of light rays by manipulation of control knob 61 from the front of the case 20. When the aircraft enters the beam the needle 9 swings to the right, the disc 10 uncovers the aperture 22 rendering light 24 instantly visible as a flash, warning the pilot of his position. The needle 9 continues to swing to the right and deflects up to a maximum position where it hesitates for a second over calibrated scale 23 and, as the aircraft emerges from the beam the needle falls gradually back to the normal position obstructing the light 24 from the pilot's vision.

The pilot reads the altitude indicated by the maximum deflection of the needle 9 over calibrated scale 23. The calibrations on scale 23 are in feet of elevation of the aircraft over the marker beacon, and the scale calibrations are a maximum near the limit of the deenergized position of the needle 9 and a minimum at the other end or full scale swing of the needle 9.

In order to obtain consistent and dependable readings several conditions must be satisfied, i. e.:

(A) The aircraft should pass exactly over the projector and the direction of flight should be parallel to the direction of the doublet antenna on the ground. This condition is easily satisfied because in the ground installation the doublets are lined up with the direction of flight. With the aid of the radio compass the pilot follows the landing path defined by the two guiding stations and always brings the aircraft exactly over the guiding station.

(B) The value of the electromagnetic field in the beam must remain constant. This is realized by installing a metallic screen under the doublet and maintaining the radiation current in the antenna constant. The screen is necessary because part of the energy in the beam is due to the reflection from the ground. The ground conductivity varies with the nature of the soil, moisture content, etc. A metallic screen under the antenna insures a constant reflection because its conductivity remains the same for all weather conditions. In order to prevent absorption of energy by the screen its length should be greater than half the length of the wave radiated. For a four meter wave a screen two meters long by one meter wide is sufficient.

In order to insure constant radiation from the projector the oscillator should be very stable and operated below the normal output.

The receiver gain can be maintained constant by preferably using a single tube as detector and maintaining the cathode and plate voltages constant.

Fig. 7 shows the method of controlling the radiation from the ultra-high frequency doublet antenna 12. I have devised a simple and practical circuit arrangement which insures a constant radiation from the marker beacon projector 12 on the ground for coaction with the calibrated marker beacon receiver carried by the aircraft.

I provide an ultra-high frequency oscillator comprising a vacuum tube 25, a tuning condenser 26, and inductance coils 27 coupled to a doublet antenna 12 through the coils 28 at the ends of a thermocouple 29. The thermocouple 29 rectifies the current flowing at the center of the doublet and the direct current produced is sent through a moving coil 30 of a direct current instrument 31. The indicator arm 32 of the direct current instrument 31 is capable of making contact with two contact points 33, 34, which can be set in any desired position in the path of movement of the needle 32. When the contact is more against one or the other of the two contacts a current is sent from battery 35 into one of the windings of the differential relay 36. The armature 37 of this relay moves an arm 38 which closes a path for the current from the same battery 35 through the differential windings 39, 40, of the series motor 41 causing the motor to move in one direction or in the opposite direction. The shaft 42 of the motor 41 moves the arm 43 of rheostat 44 back and forth which regulates the voltage applied on the plate circuit of oscillator system O through the transformer 45.

The operation of the system is as follows: The oscillator O is set in operation and the antenna current is regulated for the normal calibration of the projector as for example, five amperes. The two contact points 33, 34, are brought in the immediate vicinity of the needle 32 and the wiring is arranged so that if the antenna current increases the motor 41 rotates the arm 43 of rheostat 44 towards greater values of the resistance 46 inserted in the plate circuit. As a result the plate voltage drops and consequently the radiation decreases, the needle 32 recedes to normal position and the motor stops. If the radiation decreases, the contact occurs against 33 and the motor 41 drives arm 43 decreasing the value of the resistance 46 in the plate circuit. Consequently, the plate voltage increases, the radiation increases, and the needle 32 moves again toward normal position.

The cathode of oscillator tube 25 is heated through a filament transformer 47 energized from a suitable source. The primary circuits of both transformers 45 and 47 are controlled through switches 48 and 49 arranged as shown. A milliammeter indicating the current in the plate circuit is provided at 50. The oscillator is provided with a by-pass condenser shown at 51 and a choke coil shown at 52.

The sensitivity of the receiver shown schematically in Fig. 6 is checked from time to time or at the beginning of each flight with a conventional standard signal generator and the batteries, where used, are checked with a conventional voltmeter. Experience shows that the gain of the receptors used extensively by the Air Corps of the United States Army remains constant over a period of months and only occasional checks are essential from time to time.

In the operation of the system of my invention the pilot sets his course according to the radio guiding stations and is informed of his passage over the outer guiding station by the flash indication observed when the disc 10 uncovers aperture 22, rendering signal lamp 24 visible to the pilot. Because the pilot's attention is directed by the flash of his position over the outer guiding station, he can check his distance to the landing field knowing the location on the ground of the outer radio guiding station from the landing field. The pilot's attention having been attracted to the indicator by reason of the flash indication thereon, he is immediately thereafter informed of the absolute altitude of the aircraft above the ground by observing the extent of deflection of the indicator arm 9 over calibrated scale 23. For altitudes in the nature of 5000 feet, the angular deflection of the indicator arm 9 is slight. For lower altitudes, the angular deflection of indicator arm 9 is much greater, as will be observed in considering the arrangement of the calibrated scale on the indicator. The indicating mechanism serves in the dual capacity of informing the pilot of the position of the aircraft over the guiding stations as well as advising the pilot of the absolute altitude of the aircraft above the guiding stations. The pilot having been informed of his position from the landing field by the flash indication received when the aircraft passes over the outer guiding station is then placed on his guard to watch for the position of the inner guiding station. The pilot knowing the distance of the inner guiding station from the outer guiding station and the location of the landing field with respect to both stations, has a sense of security in maneuvering the aircraft. Upon passing the outer guiding station, the pilot may commence a glide path at an angle which he knows would give the aircraft the desired altitude upon passing the inner guiding station. Accordingly, upon receiving the flash signal upon passage over the inner guiding station, the pilot is able to check the altitude of the aircraft at the inner guiding station and maneuver the aircraft with respect to both guiding stations to secure the altitude at the inner guiding station which will enable a safe landing to be effected on the landing field adjacent the inner guiding station. This method of safe navigation of aircraft is made possible by combining with the flash indicating mechanism, the calibrated indicator system. The calibrated indicator system may be depended upon for accurate and precise operation because of the constant regulation of the emission from the ultra-high transmitter employed as part of the marker beacon system.

While I have described my invention in certain of its preferred embodiments, I desire that it be understood that modifications may be made and that no limitations upon my invention are intended other than may be imposed by the scope of the appended claims.

What I claim as new and desire to secure by Letters Patent of the United States is as follows:

1. In a marker beacon receiver apparatus, an indicator comprising a normally hidden light device, means operative upon initial energization of said apparatus for revealing said device, and a calibrated scale and an indicator movable thereover in conjunction with said means for indicating the relative amplitude of the signal energy received by said apparatus after operation of said means.

2. Indicating apparatus for a marker beacon receiver comprising in combination a calibrated scale, a normally hidden light signal device located adjacent the highest calibration on said scale, an indicator arm movable over said scale and having means for revealing said light signal device, said indicator arm being movable over a progressive path along said calibrated scale whose calibrations decrease to a minimum adjacent the end of the calibrated scale remote from the position of the light signal device.

3. In a marker beacon receiver apparatus, a meter connected with the output of said apparatus and comprising an angularly movable coil device, a calibrated scale, calibrations carried by said scale, a light source located adjacent the end of said scale having the highest calibrations thereon, an indicator arm connected with said angularly movable coil, a shutter carried by said indicator arm for normally rendering said light source invisible from the front of the calibrated scale, the calibrations on said scale reducing from a maximum adacent said light source to a minimum at the opposite end of the scale, said arm being movable over said scale for indicating by the extent of movement thereof, the amplitude of the signal energy received by said apparatus after said light source is initially rendered visible.

4. In a marker beacon receiver, a meter actuated by the output of said receiver and comprising means for producing a magnetic field, an angularly shiftable coil suspended in said field and movable in accordance with the amplitude of the signal energy incident upon said receiver, an indicator arm connected with said angularly shiftable coil, a shutter member carried by said indicator arm, a calibrated scale arranged adjacent said indicator arm with the calibrations thereon extending from a maximum adjacent one end of said scale to a minimum adjacent the opposite end of said scale, a light source located adjacent the end of said scale which is marked with the highest calibrations thereon and adapted to be normally covered by said shutter member, said light source being rendered visible when said indicator arm is shifted upon excitation of said receiver by signal energy, and said indicator arm being thereafter movable over said calibrated scale for indicating by the extent of movement, the relative intensity of the signal energy incident upon said receiver.

5. In a marker beacon receiving system for aircraft, a meter comprising an angularly movable winding shiftable in accordance with the amplitude of the signal energy incident upon said receiving system, an indicator arm connected with said winding, a calibrated scale having calibrations thereon extending from a maximum adjacent one end of the scale to a minimum adjacent the other end of said scale, a warning signal located adjacent the end of said scale having the maximum calibrations thereon, and means actuated by said winding for controlling said signal and operative to indicate the initial condition of energization of said receiving system, said indicator arm being thereafter movable over said calibrated scale for indicating, by the extent of movement thereof, the relative amplitude of the signal energy incident upon said receiving system.

6. In marker beacon receiving apparatus for aircraft, a meter having a movable coil connected with the receiving apparatus, an indicator arm connected with said coil and movable in a predetermined path, a calibrated scale disposed in the path of movement of said indicator arm, said scale being marked in units directly indicating the altitude of the aircraft from the ground, a light source disposed adjacent the maximum altitude designation on said scale, a shutter carried by said indicator arm for normally obstructing said light source from view whereby the initial energization of said coil due to energy incident upon said receiving apparatus effects movement of said indicator arm for rendering said light source visible, said indicator arm moving to a position on said calibrated scale for designating the altitude of the aircraft from the ground according to the relative amplitude of the signal energy incident upon said receiving apparatus.

7. An ultra-high frequency marker beacon for propagating a substantially constant field of force in the path of flight of an aircraft comprising a doublet antenna for radiating a substantially fan shaped beam of ultra-high frequency energy in the path of flight of an aircraft, a thermocouple disposed symmetrically between the parts of said doublet antenna, a source of ultra-high frequency energy connected with said doublet across said thermocouple, a differential relay system controlled by said thermocouple, a voltage regulator controlled by said differential relay system, and a connection between said source of ultra-high frequency energy and said voltage regulator for controlling the supply of ultra-high frequency energy to said doublet and compensating for changes in amplitude of energy radiated by said doublet for maintaining the field intensity established by said doublet substantially constant.

CONSTANTIN D. BARBULESCO.